United States Patent
Currier (10) Patent No.: US 6,170,685 B1
(45) Date of Patent: Jan. 9, 2001

(54) FOLDING ELECTRICAL OUTLET BOX

(76) Inventor: Forrest R. Currier, 125 Hilldale Ave., Haverhill, MA (US) 01832

( * ) Notice: Under 35 U.S.C. 154(b), the term of this patent shall be extended for 0 days.

(21) Appl. No.: 09/548,801

(22) Filed: Apr. 14, 2000

Related U.S. Application Data (60) Provisional application No. 60/129,792, filed on Apr. 16, 1999.

(51) Int. Cl.$^7$ ........................................................ H02G 3/00
(52) U.S. Cl. .............................. 220/3.3; 220/3.2; 220/3.5; 220/6
(58) Field of Search ................................ 220/3.2, 3.4, 3.5, 220/3.6, 3.3, 6

(56) References Cited

U.S. PATENT DOCUMENTS

| | | | |
|---|---|---|---|
| 2,850,202 | * | 9/1958 | Schneider et al. ................. 220/3.2 X |
| 4,202,457 | | 5/1980 | Tansi . |
| 4,297,525 | | 10/1981 | Bowden . |
| 4,304,957 | | 12/1981 | Slater et al. . |
| 4,332,330 | | 6/1982 | Lockwood . |
| 4,438,859 | * | 3/1984 | Solek ................................. 220/3.3 X |
| 4,896,787 | | 1/1990 | Delamour et al. . |
| 5,316,165 | * | 5/1994 | Moran, Jr. .......................... 220/3.2 X |
| 5,434,359 | | 7/1995 | Schnell et al. . |
| 5,603,424 | * | 2/1997 | Bordwell et al. ..................... 220/3.5 |
| 5,680,947 | | 10/1997 | Jorgensen . |

* cited by examiner

Primary Examiner—Steven Pollard
(74) Attorney, Agent, or Firm—Vernon C. Maine; Scott J. Asmus (57) ABSTRACT

A foldable, electrical box kit for on-site assembly and installation in wallboard, with at least two opposing panels each having a pair of spaced apart front face flanges and respective, laterally centered on the panel, center-bored, retaining screw and rotating retainer clip assemblies. The unfolded box is configured with living hinge lines to permit easy folding and snap assembly of adjacent sidewall edges to form a rigid enclosure. Retainer clips are retracted by their retaining screws into clip slots in the panels for clearance. The box is inserted through wallboard as far as the front face flanges permit, then the retaining screws are rotated, the first quarter turn of which rotates their respective retaining clips from the retracted position to an extended position behind the wallboard. Further clockwise rotation of each screw brings its retaining clip forward into a firm, three point grip with its respective pair of flanges on the wallboard. Retaining screws are center-bored and threaded, and spaced to accept attaching screws for standard size devices being installed in the box, thereby providing both structure support and a convenient point for electrical ground bonding.

20 Claims, 11 Drawing Sheets

FOLDING ELECTRICAL OUTLET BOX

This application claims priority to pending U.S. application Ser. No. 60/129,792, filed Apr. 16, 1999, by the same applicant.

BACKGROUND OF THE INVENTION

1. Technical Field of the Invention

This invention most generally relates to electrical outlet boxes as are customarily used for wall mounting of electric lighting circuit switches and electrical power outlets and related devices; and more particularly it relates to folding electrical outlet boxes intended for assembly and installation in wallboard.

2. Background Art

The construction industry has a long established practice of using wall mounted junction boxes to mount electrical power outlets and light switches and otherwise join and/or terminate electrical wires for user access to power for portable devices or control of lighting circuits and the like. Many variations of wall-mounted, open face junction boxes are represented in past and present commercially available products, and in the patented art, some being foldable, some disclosing new features.

For example, folding boxes are represented by Tansi's U.S. Pat. No. 4,202,457, a molded plastic foldable electrical outlet box with so-called "living hinge" joint lines for folding, a groove and blade structure for joining panel edges at right angles, and integral sleeves for nails for attaching the box to a stud. Jorgensen's U.S. Pat. No. 5,680,947 discloses a foldable electrical box for new work installations, with upper and lower nailing flanges for nailing the box to a stud. Both are for new work, prior to installation of wallboard. Schnell's U.S. Pat. No. 5,434,359 shows upper and lower, corner configured, rotable retention clips and screws that are used to secure a non-metallic, "old-work" box within a hole in the wallboard.

Bowden's U.S. Pat. No. 4,297,525 and Slater et al's U.S. Pat. No. 4,304,957 illustrate a box having corner mounted rotable retention clips, related to those of Schnell's clips. Recessed, self clamping cable entry ports are also shown.

Bordwell's U.S. Pat. No. 5,603,424 discloses an old-work, wall mounting assembly with hinged side flaps as retention means, where the flaps are unfolded and brought forward to bear on the inside surface of the wallboard. Lockwood's U.S. Pat. No. 4,332,330 discloses a related, deployable flap structure for old work or "cut-in" work, as it may be called. Resilient hinges at the hinge line of the foldable wall panels of an electrical junction box, which become rigid under tension of the fold, are disclosed in Delamour et al's U.S. Pat. No. 4,896,787.

In summary, problems not adequately addressed in the art include the need for an electrical junction box system for a rework, or cut-in or old work applications, that folds flat for efficient bulk packaging, distribution and storage; that has no unattached parts to get lost; that provides for simple snap lock assembly in single or ganged configurations; that has a simple, front actuated, upper and lower centerline retainer mechanism permitting quick and secure installation without tilt to one side or the other; that has provision for quick and ready grounding of the receptacle or switch assembly mounting plate to the box, that has flush, self-clamping cable ports; and that retains a maximum amount of interior space for wiring.

SUMMARY OF THE INVENTION

The invention, most simply stated, is a design for a foldable electrical box for mounting in wallboard that combines the features of living hinges for folding, key and slot edges for easy fold and snap together assembly of the box, upper and lower sets of front face flanges and respective center-bored screw and rotating clip assembly configured so as to permit installation of the box by inserting it into a suitably sized hole in the wallboard of a wall, as far as the front edge flanges allow, so that the bulk of the box, including the retaining clips, is behind the wallboard in the interior cavity of the wall, then with screwdriver or similar tool, rotating the center-bored screws clockwise, the first quarter turn of which rotates the respective clips from the retracted or stowed position to an extended centerline position behind the wallboard, and further rotating the screws clockwise to bring the clips forward into firm contact with the backside of the wallboard so as to lock the box in place.

The center-bored screws are configured with conventional means of inhibiting reverse rotation once tightened. The upper and lower screws are configured so as to position their center bores at the lateral center and with proper vertical spacing to accommodate the mounting screws of industry standard switches, duplex receptacles, and other commonly used devices.

The box is a molded, one piece design, with living hinge features to provide for folding lines and with snap-in edge keys and slots for locking the mating edges. The top and bottom panels of the box are molded or formed with right angle front edge flanges directed outwardly from the box, interior tunnels for the center-bored screws, retraction slots for the retainer clips, and flush cable lock ports.

The box is molded or formed so as to accept insertion of the upper and lower screw and retaining clip sets in a non-releasable fashion, so that they cannot become separated from the box during ordinary handling, assembly and installation.

A gangable embodiment of the box utilizes a bipolar interlock mechanism to provide a universal side to side joining scheme.

It is therefore an object of the invention to provide a folding electrical box that will pack more densely and take up less space for the manufacturer, distributor and end user than the conventional, fully formed boxes.

It is an object of the invention to have a centerline retaining mechanism with a three point grip on the wallboard at the top and bottom of the box, so that the box is not likely to be tilted towards one side or the other or noticeably less secure when comparing one corner to another.

It is a further object to have such a box with a retractable retaining mechanism that permits the largest possible box and interior box volume for the standard size hole.

It is a yet further object to provide a folding electrical box, the components of which are already securely attached in the unassembled form so as to avoid the loss of parts and inconvenience to the user while assembling and installing.

It is a still yet further object of the invention to provide low parts count to a foldable box system, to minimize inventory requirements.

It is another object to provide a box with up to 20 cubic inches of interior room for up to ten #14 wires or eight #12 wires.

Still other objects and advantages of the present invention will become readily apparent to those skilled in this art from the following detailed description, wherein I have shown and described only a preferred embodiment of the invention, simply by way of illustration of the best mode contemplated by me for carrying out my invention.

DESCRIPTION OF THE PREFERRED EMBODIMENT

To those skilled in the art, the invention admits of many variations. An enabling description of the preferred embodiment follows.

Referring to FIGS. 1–7, box 10 is a one piece molded structure with five principle panels, back 12, left and right side panels 14, and top and bottom panels 16, foldably connected at living hinge lines 8, being then foldable into a box form and interconnected by snap together keyed edge 15 and channel 17. Keyed edge 15 is characterized by four regularly spaced slots uniformly spaced along the edge of the panel. Channel 17 is characterized by four regularly spaced, ramped lugs, corresponding to the size and spacing of the slots of keyed edge 15. As is specifically illustrated in FIG. 6, the side and top or bottom panels can be mated at their edges by snapping the keyed edges into respective channels 17; the ramped lugs and the resilience in the channels permitting the keyed edge to be pushed by the lugs until the lugs snap into the mating slots.

Figure 1:
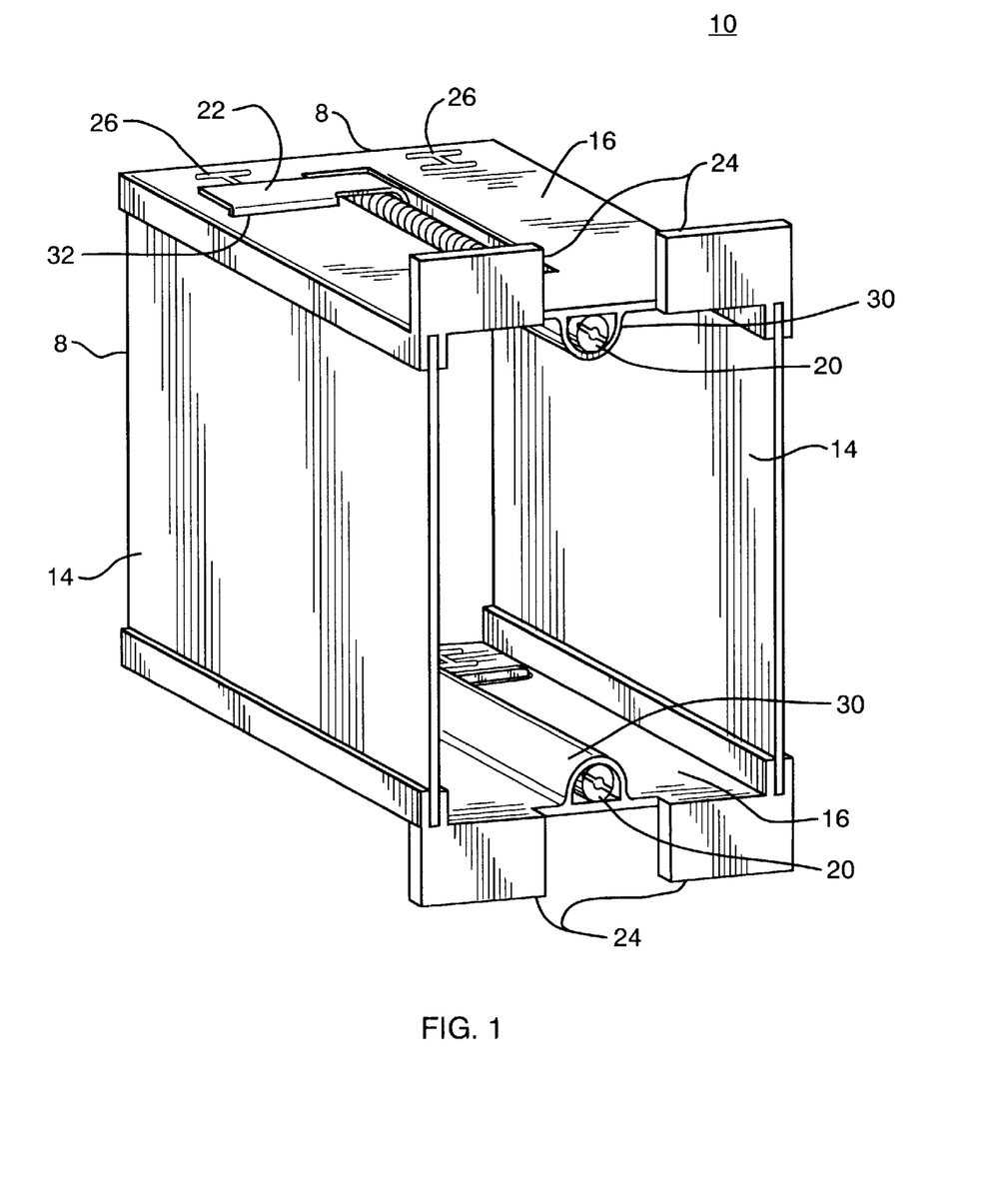
FIG. 1 is an upper front perspective view of an assembled box of the invention.
Figure 2:
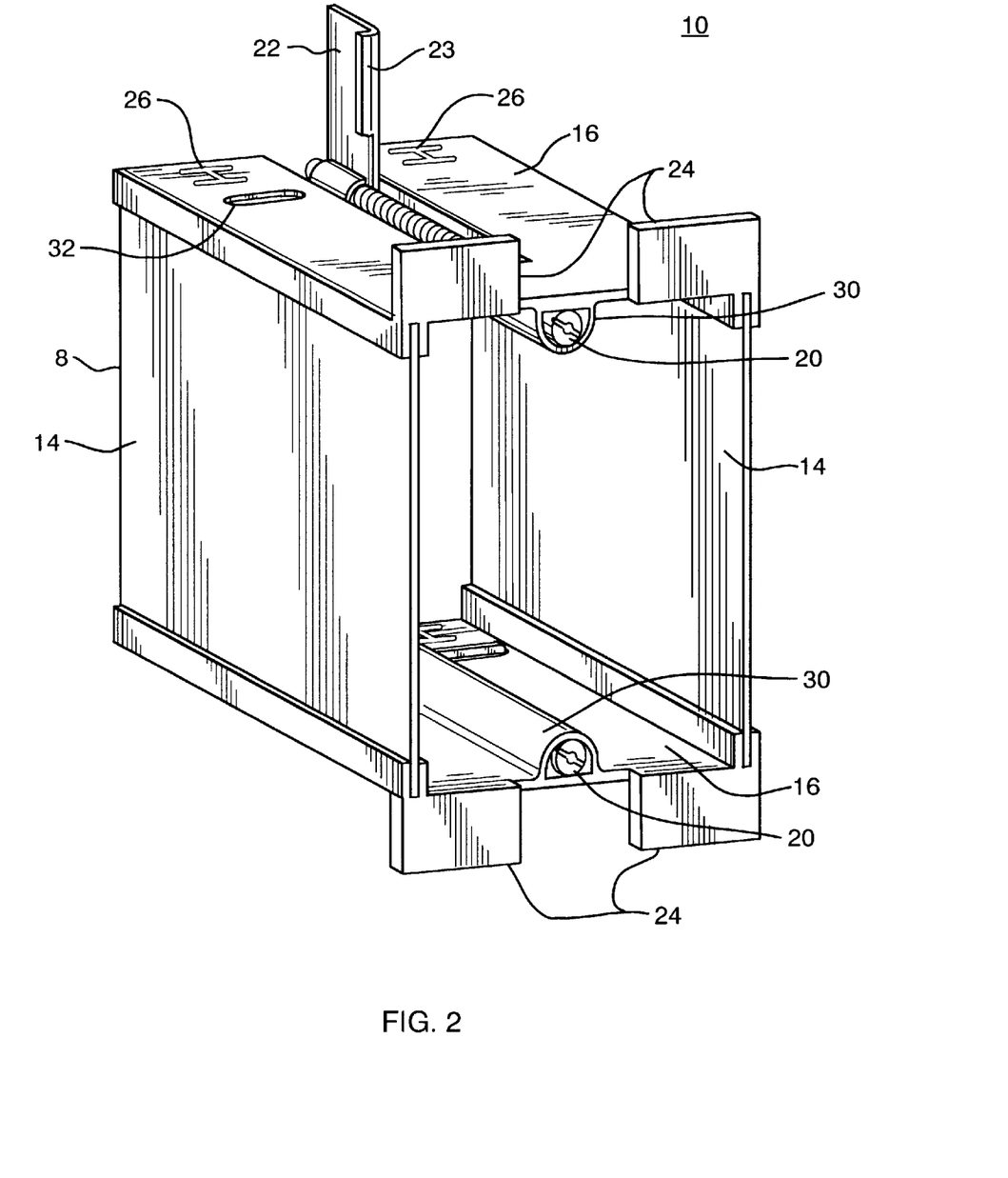
FIG. 2 is an alternate view of the embodiment of FIG. 1, with the topside rotable locking clip in the extended position.
Figure 4:
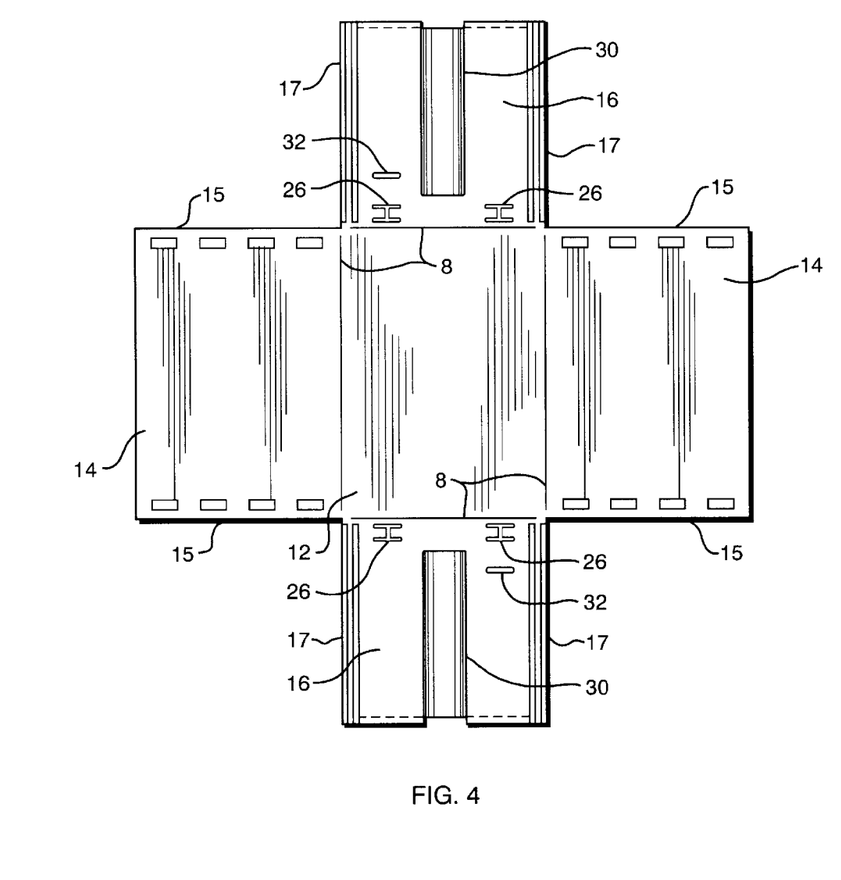
FIG. 4 is an inside planform view of the embodiment of FIG. 1 in the open or unfolded state.
Figure 5:
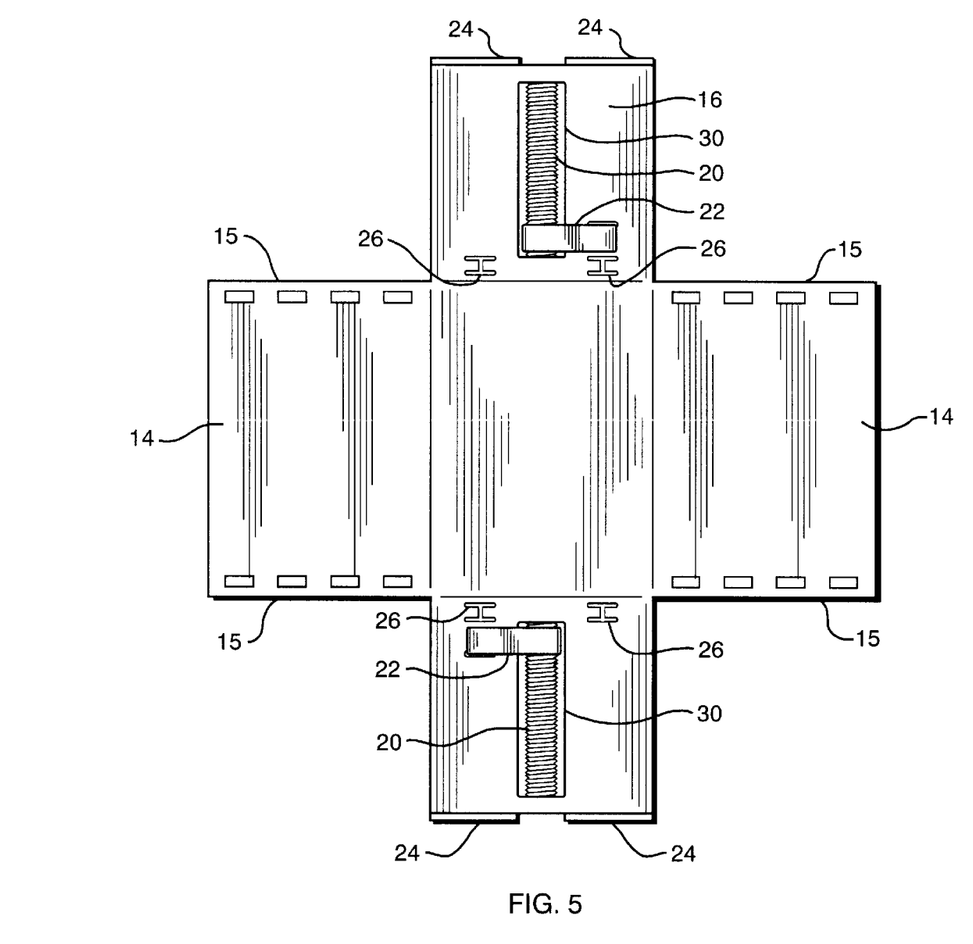
FIG. 5 is an outside planform view of the embodiment of FIG. 1 in the open or unfolded state, with the locking screws and stowed clips clearly visible.
Figure 6:
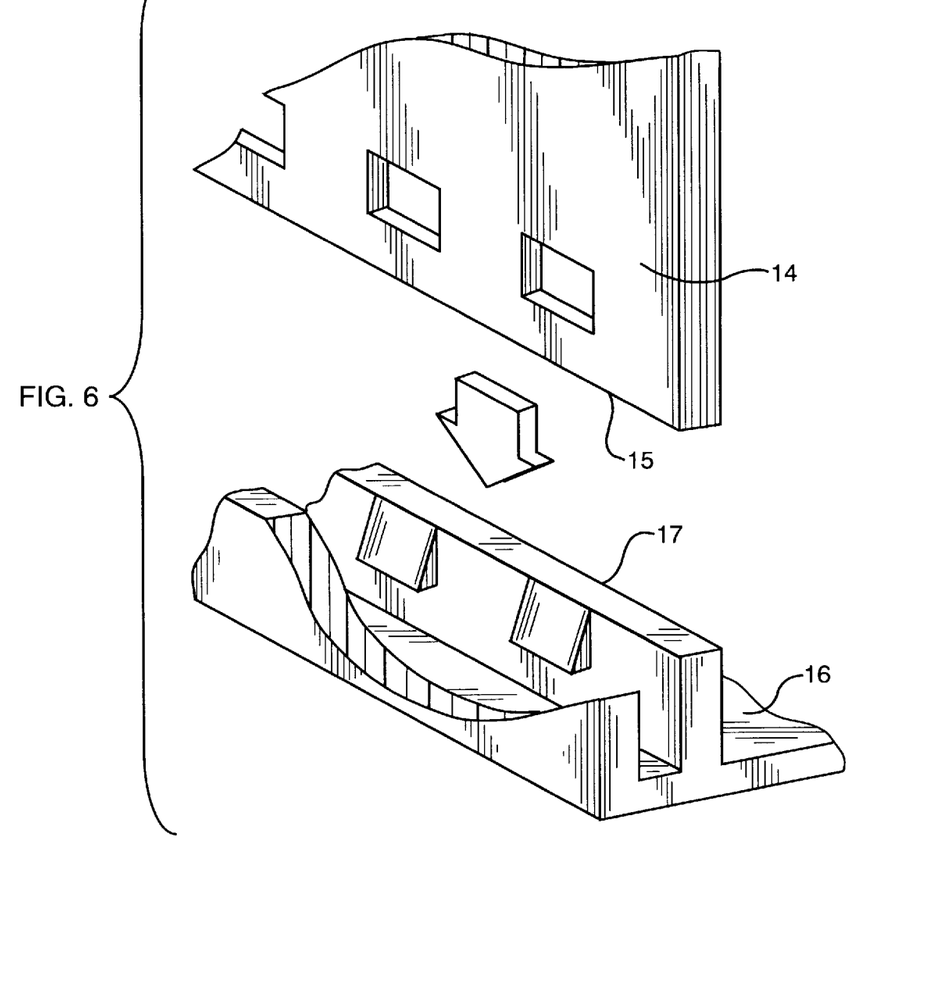
FIG. 6 is a partial perspective, close up, exploded view of the lower front corner snap lock keyed edge and channel feature of the embodiment of FIG. 1.

Back panel 12 and side panels 14 are solid, except for the illustrated mating edge structures, 15 and 17. Top and bottom panels 16 each have a pair of spaced apart front edge flanges 24, which hold the front edge of the box flush with the surface of the wallboard in which it is mounted. The spacing between the flanges permits limited visual inspection of and access if needed, to retaining clips 22. The spaced apart flanges in tangent with the centerline retention clips also provide an inherently stable three point contact grip on the wallboard, two points on the outer surface and one point on the backside surface, for both the top and bottom of the box. This assures that all four corners of the box are uniformly secure to withstand the working pressures associated with pulling wires and installing components, and provides good alignment of the front edge of the box with the surface of the wallboard so that the cover plate is properly installed.

Top and bottom panels 16 are each further configured with a molded-in, recessed tunnel structure 30 and associated clip slot 32. A screw 20 is rotably installed in each tunnel structure 30 with its head flush with the front edge of its panel 14, so that it is flush or slightly recessed from the front edge of assembled box 10. Screw 20 is configured with fore and aft necked down regions by which it is supported in tunnel 30, so that it is rotable but remains longitudinally stationary.

Tunnels 30 and screws 20 are properly spaced on the centerline of the box, and screws 20 are further bored and tapped to accept the standard screw size for installing standard duplex receptacles, light switches, and other standard size accessories in the box.

A tapped retaining clip 22, with a flat mast and right angle face plate as shown, is threaded onto screw 20 as screw 20 is installed in tunnel 30, so as to enable clip 22 to be moved forward and aft by clockwise and counterclockwise rotation of stationary screw 20. There is some friction by design in the threaded interface between clip 22 and screw 20, so that rotation of the screw tends to rotate the clip in the same direction until a resistance is met. The arc of rotation of clip 22 is counterclockwise limited by the surface of respective panel 16, permitting clip 22 to be moved aft towards the distal end of screw 20 by counterclockwise rotation of screw 20. When clip 22 is sufficiently aft, the face plate of clip 22 slides into clip slot 32 so as to be fully retracted as in FIG. 1.

Placing both top and bottom screws 20 in the retracted position allows for the box to be slid into a suitably sized hole in wallboard as far as flanges 24 allow. Clips 22 are then rotable from the retracted position in slot 32, by a clockwise quarter turn of screw 20, into an extended position as in FIG. 1. The clockwise arc of rotation of clip 22 is limited by the intersecting corner of tunnel 30 and panel 16. From there, clips 22 can be pulled forward towards the proximal end of respective screws 20 by further clockwise rotation, into firm contact with the backside surface of the wallboard, thus locking the box in position.

Figure 3:
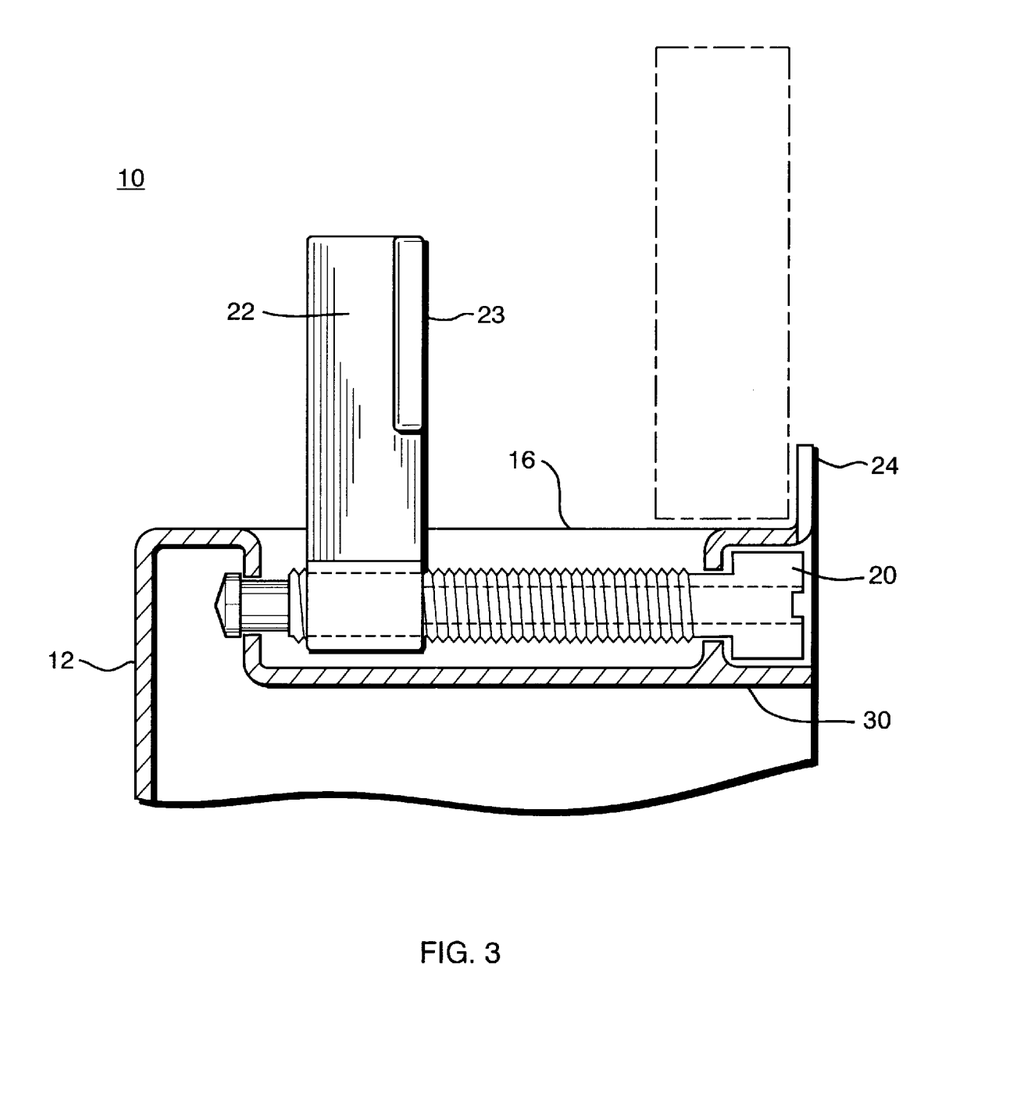
FIG. 3 is a partial cross section view of the topside of the embodiment of FIG. 2, showing the topside centerline locking screw, with rotable locking clip in the extended position, and the dashed line representing a sheet rock wall against which the locking clip will bear.

Referring specifically to FIG. 3, a partial cross section view of the upper portion of the assembled box 10, shows recessed tunnel structure 30 molded into box 10 so as to provide fore and aft end support of screw 20, and physical isolation of the threads of screw 20 from the interior of box 10. It is readily apparent that component attaching screws installed into the center bore of screw 20 are likewise isolated from the interior of box 10. Tunnel structure can be further extended aft, beyond the aft point of support of screw 20, to fully isolate and insulate screw 20 from the interior of the box.

Screw 20 provides a common electrical bond as well. In all configurations, the metal mounting yoke of conventional switch and receptacle devices are connected directly to screw 20.

Figure 7A:
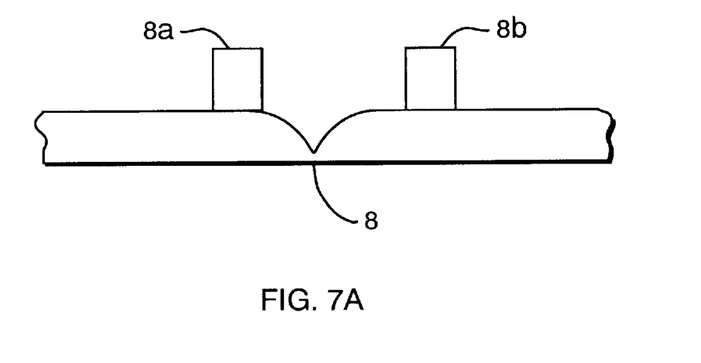
FIGS. 7A and 7B are cross section detail views, unfolded and folded, of the integral folding hinge line of the back side panel of the FIG. 1 embodiment.
Figure 7B:
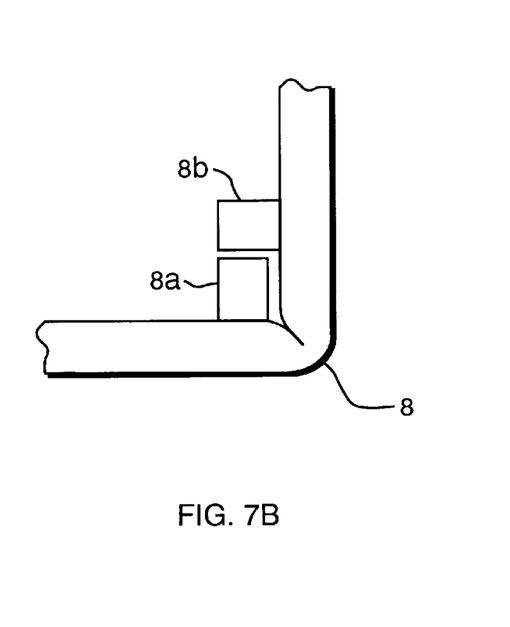

Referring to FIGS. 7A and 7B, a cross section partial view of living hinge line 8, a V notch on the interior side of the panels, is show in unfolded and folded conditions. Hinge line 8 is common to all four sides of the embodiment of FIG. 1. Also present in FIGS. 7A and 7B and not shown in other figures are optional reinforcing corner beads 8A and 8B. These structures are parallel to the V joint, with bead 8A being immediately adjacent the V notch and bead 8B being displaced a bead width away so that the two beads interlock without interfering with the folding of the panels.

Figure 8:
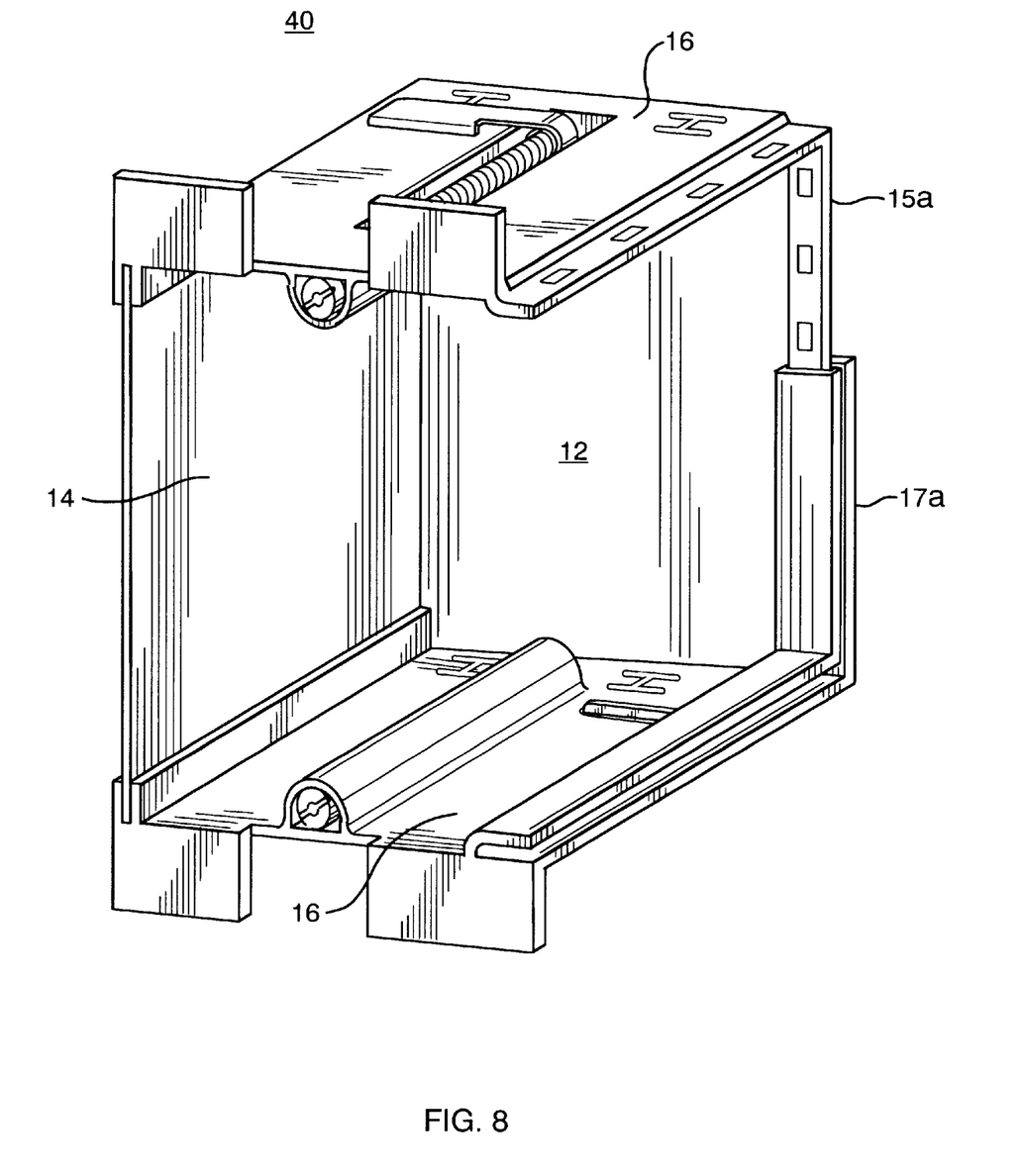
FIG. 8 is a perspective view of a single open side, common part, gangable embodiment of the invention, with a bipolar, snap lock keyed edge and channel joints enabling side to side ganging in pairs as double width boxes or with center sections as triple width or wider boxes.
Figure 11:
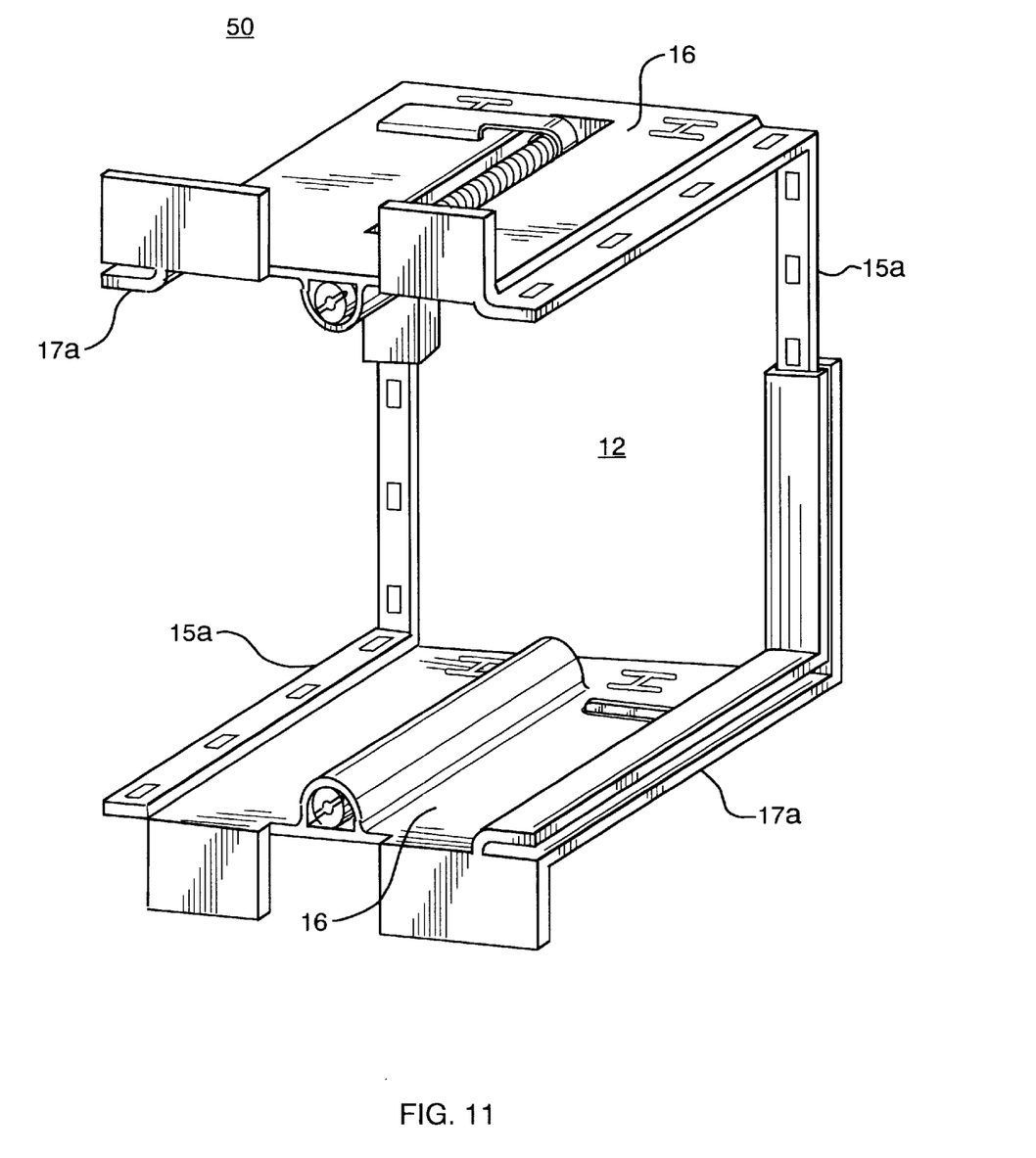
FIG. 11 is a perspective view of a double open side, common part, gangable embodiment of the invention, with bipolar snap lock joints on both sides, enabling insertion between a pair of the embodiments of FIG. 8, for triple width and wider boxes.

FIGS. 8 and 11 are perspective views of related alternate embodiments of FIG. 1. FIG. 8 is a single open-sided foldable box 40, two of which may be ganged together with snap lock joints to form a double width box, or with the insertion of one or more FIG. 11 double open-sided foldable box sections 50 between two box 40's, to a triple width or even wider assembled box. Bipolar keyed edge 15A and channel 17A snap lock edge connection runs along one side from top panel 16, along back panel 12, to bottom panel 16. The bipolar aspect means that a first half of the exposed edge is configured as keyed edge 15A, and the second half is configured with the corresponding lugged channel 17A. This feature enables a common box 40 to be turned over bottom to top, and be snap lock attached to a second box 40.

Box section 50 of FIG. 11, has open sides and exposed edges on both sides, with bipolar keyed edge 15A and channel 17A extending along both exposed edges from top panel 16, along back panel 12, to bottom panel 16, with reversed polarity, so as to be connectable between a pair of box 40s.

Figure 9A:
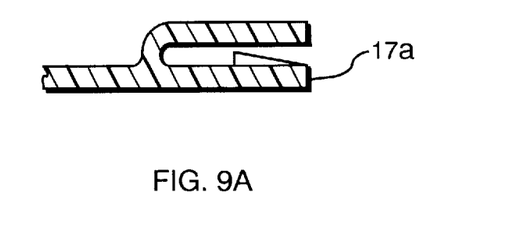
FIG. 9A is a cross section close up view of the receiving slot or channel component of the snap lock joint of the embodiment of FIG. 8.
Figure 9B:
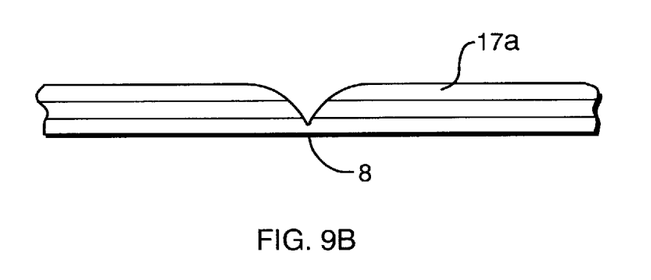
FIGS. 9B and 9C are the unfolded and folded close up edge views of the corner region of the receiving slot or channel component of the embodiment of FIG. 9A.
Figure 9C:
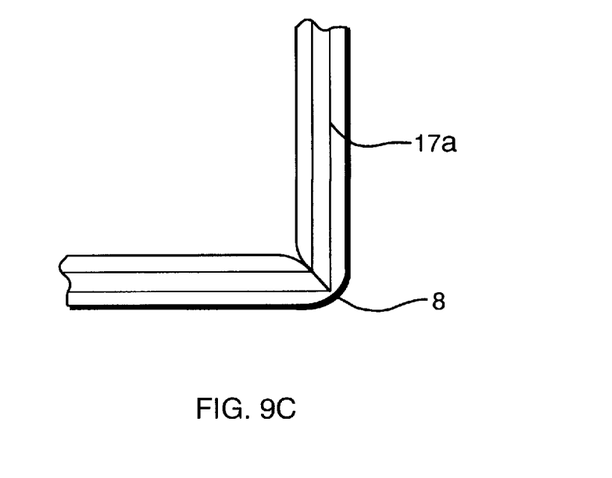
Figure 10A:
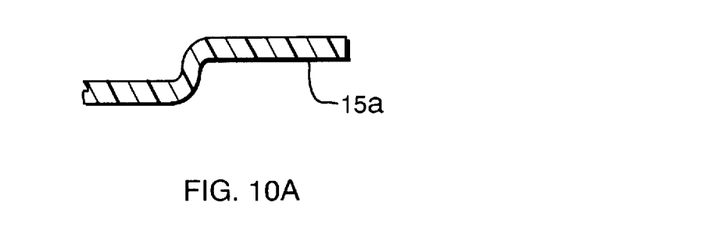
FIG. 10A is a cross section close up view of the keyed edge component of the snap lock joint of the embodiment of FIG. 8.
Figure 10B:
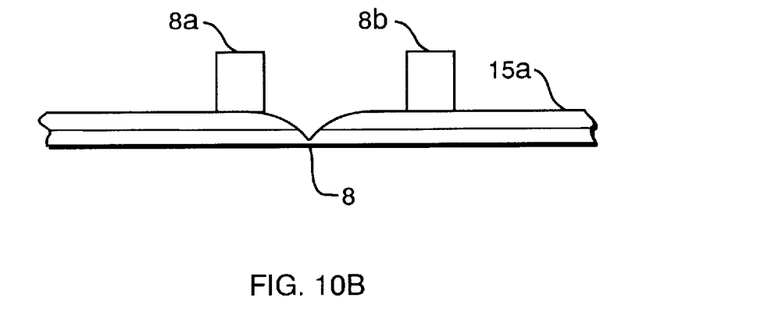
FIGS. 10B and 10C are the unfolded and folded close up edge views of the corner region of the keyed edge component of the embodiment of FIG. 10A.
Figure 10C:
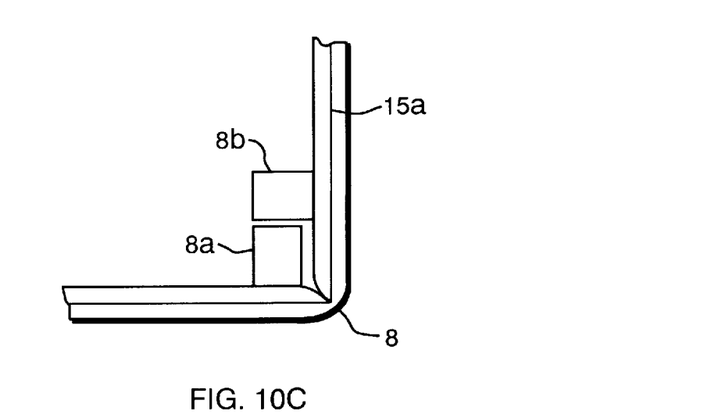

FIGS. 9A–9C, show the details of the lugged channel 17A and how it folds over living hinge line 8 to maintain the continuity of the channel structure. FIGS. 10A–10C show corresponding details of keyed edge 15A.

The top and bottom panels 16 of box 40 and box section 50 utilize the same tunnel 30, screw 20, locking clip 22, clip slot 32, cable ports 26 and flanges 24 of box 10 of FIG. 1.

As will be realized, the invention is capable of other and different embodiments, and its several details are capable of modifications in various obvious respects, all without departing from the invention.

For example, the keyed edge and lugged channel snap lock joint can be of any and various designs, snap-lock, interlock, adhesive, integral or added. Variations of the box may be in other than the standard size. Wire or cable ports may be self-locking or may accept Romex-type two part connectors or snap-in connectors. Cable ports may provide for installer-accomplished enlargement, so as to accommodate more wires in a particular port.

As another example, there is a foldable electrical enclosure for mounting in wallboard, consisting of a back panel hingedly edge connected to at least two pairs of opposing side panels, where the side panels are foldable to be at right angles to the back panel and have integral interlocking structure for connecting adjacent panel edges so as to form a rigid, open face enclosure. Each panel of at least two opposite side panels is configured with a pair of spaced apart, front face, outwardly projecting mounting flanges on the front edge of the panel, and a laterally centered and recessed tunnel structure supporting a retaining screw. The head of the retaining screw is exposed for rotational manipulation with a screw driver. Each retaining screw has a retainer clip threaded on to it with some friction, so the retainer clip can be rotated from a retracted position against the surface of the panel to an extended, straight out position on the centerline of the enclosure as drawn between the opposite side retaining screws. The extension is caused by initial clockwise rotation of the retaining screw. The clip is movable forwards towards the front edge and the flanges by further clockwise rotation of the retaining screw. Each retaining screw is center bored and threaded for accepting mounting screws of devices normally installed in such enclosures. The cable ports are H pattern cutouts in the top panel and bottom panel, and the panels are sufficiently elastic for limited deforming of the tongues of the H patterns inward, without damage, by insertion of wires through the cutouts.

As yet another example, there is a foldable non-conductive electrical enclosure for mounting in wallboard consisting of a one piece molded plastic where the rectangular back panel is hingedly connected by living hinge lines to the left and right side panels and to the top and bottom panels. The panels are foldable to right angles with the back panel so as to form an open face enclosure. The panels are configured with a structure for connecting adjacent panel edges. The front edges of the top and bottom panels are each configured with two outwardly directed, spaced-apart mounting flanges. The top and bottom panels are each configured with a laterally centered, recessed tunnel structure oriented perpendicular to and flush with the front edge of the panels and open to the exterior side of the panel.

There is a stationary retaining screw rotably installed within each tunnel structure, the head of each screw being accessible for rotational manipulation by a screwdriver. The retaining screws are center-bored and tapped for accepting smaller mounting screws. The spacing of the retaining screws conforms to standard mounting dimensions of devices normally installed in such enclosures. The retaining screw may be made from a conductive material for electrical bonding.

A retaining clip is associated with each retaining screw. This clip consists of a nut, a mast, and a faceplate, where the nut is threaded onto its respective retaining screw, and the mast extends from the nut external of the enclosure and perpendicular to the retaining screw. The faceplate is attached to the mast and oriented parallel to its respective mounting flanges.

The retaining clip is rotable about one quarter turn between a retracted position against exterior surface of the panel and an extended centerline position by an initial clockwise rotation of the retaining screw. The retaining clip then may be moved forwards towards the front edge by further clockwise rotation of the retaining screw.

The structure for connecting adjacent edges is consists of a keyed edge on one panel and a locking channel on the adjacent panel. The keyed edge is located immediately adjacent to the panel edge and consists of five uniformly spaced rectangular keyholes. Likewise, the locking channel is located immediately adjacent to the panel edge and consists of uniformly spaced tapered lugs. As the lugs are sized for interlocking fit with the keyholes of the keyed edge, the taper of the lugs ramps upwards going into the channel. The locking channel is sufficiently elastic to be forced open then close without damage as the keyed edge is inserted into the channel.

The living hinge line consists of a V notch on the interior side of the panels. Each hinge line is reinforced with a raised bead located immediately adjacent and parallel to the V notch on the interior side of the back panel. Another raised bead is located parallel to and spaced about one bead width from the V notch on the interior side of the side panel. The height and width of the raised beads are sized such that when the side panels are folded to right angles with the back panel, the beads interlock without interfering the fold line.

As still yet another embodiment of the box, the foldable non-conductive electrical enclosure may consist of a rectangular back panel hingidly connected to a top, bottom and side panels. To form a semi-enclosure with an open face and an open side, the one side panel is folded then interlocked to the top and bottom panels using a key and slot edge scheme. To enable connection with a second semi-enclosure, the open face edge has a bipolar keyed edge and locking channel system where one half of the edge length is configured with a uniformly spaced keyholes and the other half with a channel containing uniformly spaced lugs. A double width enclosure is formed by joining the keyhole of one face edge to the tapered lugs of another face edge.

Furthermore, the non-conductive electrical box may consist of a top and bottom panels hingidly connected to a rectangular back panel. To form a semi-enclosure with an open face and open sides, the top and bottom panels are folded at right angles to the back panel. The panel edges adjacent to the open sides are configured with a bipolar interlock mechanism for edge connecting to a similarly configured semi-enclosure to form a multiple width enclosure.

In summary, the invention is distinguished from the prior art by providing a fully contained, folding electrical box, suitable in particular for re-work applications where the wallboard is already installed. The invention includes a centerline retaining mechanism that doubles as the receiving bore for the mounting screws of common electrical switches and other devices. The box grips the wallboard with a top and bottom side, laterally centered three point contact that assures a no-tilt fit and uniform resistance to being pushed or pulled out of flush with the wallboard. The threads of the retaining screw and device attaching screws are shielded from contact with interior wires. The retaining screws provide a simple, integral point of electrical bonding. The box provides for a larger interior than other designs, and offers an embodiment with a fully insulated interior volume.

What is claimed is:

1. A foldable electrical enclosure for mounting in wallboard, comprising a back panel hingedly edge connected to at least two pairs of opposing side panels, said side panels foldable to be at right angles to said back panel and having integral means for connecting adjacent panel edges so as to form a rigid, open face enclosure, said enclosure having at least one cable port through which electrical wires may be inserted, each said panel of at least one pair of said opposing side panels configured with a pair of spaced apart front face outwardly projecting mounting flanges and a laterally centered and recessed tunnel structure supporting a retaining screw, the head of said retaining screw exposed for rotational manipulation with a screw driver, each said retaining screw having a retainer clip threaded thereon, said retainer clip being rotable from a retracted position to an extended centerline position by initial clockwise rotation of said retaining screw and being movable forward towards said flanges by further clockwise rotation of said retaining screw, each said retaining screw being center bored and threaded for accepting mounting screws of devices normally installed in such enclosures.

2. A foldable electrical enclosure for mounting in wallboard according to claim 1, said at least two pairs of opposing side panels comprising two opposing side panels and a top and opposing bottom panel.

3. A foldable electrical enclosure for mounting in wallboard according to claim 2, said top and said bottom panel each configured with a said pair of spaced apart front face outwardly projecting mounting flanges and a said laterally centered and recessed tunnel structure supporting a retaining screw.

4. A foldable electrical enclosure for mounting in wallboard according to claim 3, said retaining clip comprising a nut, a mast, and a face plate, said face plate being parallel to said mounting flanges.

5. A foldable electrical enclosure for mounting in wallboard according to claim 4, said integral means for connecting adjacent panel edges comprising a keyed edge and locking channel system, a first panel of two adjacent panels configured with a said keyed edge, a second of said two adjacent panels configured with a said locking channel.

6. A foldable electrical enclosure for mounting in wallboard according to claim 5, said keyed edge comprising five uniformly spaced rectangular keyholes immediately adjacent to a straight panel edge, said locking channel comprising an open receiving channel structure within which on one wall are configured five uniformly spaced tapered locking lugs, the taper of which ramps upwards going into said channel, said lugs sized for interlocking fit with said keyholes of said keyed edge, said locking channel being sufficiently elastic for being forced open without damage by inserting said keyed edge into said channel until said lugs interlock with said keyholes and then closing thereon.

7. A foldable electrical enclosure for mounting in wallboard according to claim 5, said back panel hingedly edge connected to said side panels and said top and bottom panels by living hinge lines, said hinge lines comprising a V notch on the interior side of said panels, each said hinge line connecting said back panel to a said side panel reinforced with a first raised bead on the interior side of said back panel immediately adjacent and parallel to respective said V notch, and a second raised bead on the interior side of said side panel parallel to and spaced about one bead width from said V notch, the height and width of a said raised bead each being about the wall thickness of a said panel whereupon when said side panels are folded to right angles with said back panel said beads interlock without interference with folding.

8. A foldable electrical enclosure for mounting in wallboard according to claim 5, said at least one cable port comprising H pattern cutouts in said top panel and said bottom panel, said panels being sufficiently elastic for limited deforming without damage by insertion of wires through said cutouts.

9. A foldable electrical enclosure for mounting in wallboard according to claim 5, the spacing of said retaining screws conforming to standard mounting dimensions of said devices normally installed in such enclosures.

10. A foldable non-conductive electrical enclosure for mounting in wallboard comprising a one piece molded plastic foldable open face enclosure consisting of a rectangular back panel hingedly connected by living hinge lines to left and right side panels and to top and bottom panels, said panels foldable to right angles with said back panel so as to form said open face enclosure, said panels configured with means for connecting adjacent panel edges, the front edge of said top and bottom panels each configured with two outwardly directed spaced apart mounting flanges, said top and bottom panels each configured with a laterally centered, recessed tunnel structure oriented perpendicular to and flush with said front edge of said panels and open to the exterior side of said panel, said top and bottom panels incorporating H pattern cable ports for inserting electrical cables, a stationary retaining screw rotatingly installed within each said tunnel structure, the head of each said screw being accessible for rotational manipulation by a screwdriver, said retaining screws being center-bored and tapped for accepting smaller mounting screws, the spacing of said retaining screws conforming to standard mounting dimensions of devices normally installed in such enclosures, and a retaining clip associated with each retaining screw, said clip comprising a nut, a mast, and a faceplate, said nut being threaded onto respective said retaining screw, said mast extending from said nut external of said enclosure and perpendicular to said retaining screw, said faceplate attached to said mast and oriented parallel to respective said mounting flanges, said retaining clip being rotable about one quarter turn between a retracted position against exterior surface of said panel and an extended centerline position by initial clockwise rotation of said retaining screw, said retaining clip being then movable forward towards said front edge by further clockwise rotation of said retaining screw.

11. A foldable non-conductive electrical enclosure for mounting in wallboard according to claim 10, said integral means for connecting adjacent panel edges comprising a keyed edge and locking system, a first panel of two adjacent panels configured with a said keyed edge, a second of said two adjacent panels configured with a said locking channel, said keyed edge comprising five uniformly spaced rectangular keyholes immediately adjacent to a straight panel edge, said locking channel comprising an open receiving channel structure within which on one wall are configured five uniformly spaced tapered locking lugs, the taper of which ramps upwards going into said channel, said lugs sized for interlocking fit with said keyholes of said keyed edge, said locking channel being sufficiently elastic for being forced open without damage by inserting said keyed edge into said channel until said lugs interlock with said keyholes and then closing thereon.

12. A foldable non-conductive electrical enclosure for mounting in wallboard according to claim 10, said living hinge lines comprising a V notch on the interior side of said panels, each said hinge line connecting said back panel to a said side panel reinforced with a first raised bead on the interior side of said back panel immediately adjacent and parallel to respective said V notch, and a second raised bead on the interior side of said side panel parallel to and spaced about one bead width from said V notch, the height and width of a said raised bead each being about the wall thickness of a said panel whereupon when said side panels are folded to right angles with said back panel said beads interlock without interference with folding.

13. A foldable non-conductive electrical semi-enclosure for mounting in wallboard comprising a one piece molded plastic foldable open face and single open side enclosure consisting of a rectangular back panel hingedly connected by living hinge lines to one side panel and to top and bottom panels, said panels foldable to right angles with said back panel so as to form said open face and single open side enclosure, said panels configured with means for connecting adjacent panel edges, the front edge of said top and bottom panels each configured with two outwardly directed spaced apart mounting flanges, said top and bottom panels each configured with a laterally centered, recessed tunnel structure oriented perpendicular to and flush with said front edge of said panels and open to the exterior side of said panel, said top and bottom panels incorporating H pattern cable ports for inserting electrical cables, panel edges adjacent said open side being configured with means for edge connecting to a second said one piece molded plastic foldable open face and single open side enclosure so as to form a double width enclosure, a stationary retaining screw rotatingly installed within each said tunnel structure, the head of each said screw being accessible for rotational manipulation by a screwdriver, said retaining screws being center-bored and tapped for accepting smaller mounting screws, the spacing of said retaining screws conforming to standard mounting dimensions of devices normally installed in such enclosures, and a retaining clip associated with each retaining screw, said clip comprising a nut, a mast, and a faceplate, said nut being threaded onto respective said retaining screw, said mast extending from said nut external of said enclosure and perpendicular to said retaining screw, said faceplate attached to said mast and oriented parallel to respective said mounting flanges, said retaining clip being rotable about one quarter turn between a retracted position against exterior surface of said panel and an extended centerline position by initial clockwise rotation of said retaining screw, said retaining clip being then movable forward towards said front edge by further clockwise rotation of said retaining screw.

14. A foldable non-conductive semi-enclosure for mounting in wallboard according to claim 13, said integral means for connecting adjacent panel edges comprising a keyed edge and locking channel system, a first panel of two adjacent panels configured with a said keyed edge, a second of said two adjacent panels configured with a said locking channel, said keyed edge comprising five uniformly spaced rectangular keyholes immediately adjacent to a straight panel edge, said locking channel comprising an open receiving channel structure within which on one wall are configured five uniformly spaced tapered locking lugs, the taper of which ramps upwards going into said channel, said lugs sized for interlocking fit with said keyholes of said keyed edge, said locking channel being sufficiently elastic for being forced open without damage by inserting said keyed edge into said channel until said lugs interlock with said keyholes and then closing thereon.

15. A foldable non-conductive semi-enclosure for mounting in wallboard according to claim 14, said means for edge connecting to a second said one piece molded plastic foldable open face and single open side enclosure so as to form a double width enclosure comprising a bipolar keyed edge and locking channel system, a first half of the full length of the open face edge of said semi-enclosure configured with a said keyed edge, a second half of said length of said open face edge with a said locking channel, said keyed edge comprising uniformly spaced rectangular keyholes immediately adjacent to a straight panel edge, said locking channel comprising an open receiving channel structure within which on one wall are configured uniformly spaced tapered locking lugs, the taper of which ramps upwards going into said channel, said lugs sized for interlocking fit with said keyholes of said keyed edge, said locking channel being sufficiently elastic for being forced open without damage by inserting said keyed edge into said channel until said lugs interlock with said keyholes and then closing thereon.

16. A foldable non-conductive electrical enclosure for mounting in wallboard according to claim 15, said living hinge lines comprising a V notch on the interior side of said panels, each said hinge line connecting said back panel to a said side panel reinforced with a first raised bead on the interior side of said back panel immediately adjacent and parallel to respective said V notch, and a second raised bead on the interior side of said side panel parallel to and spaced about one bead width from said V notch, the height and width of a said raised bead each being about the wall thickness of a said panel whereupon when said side panels are folded to right angles with said back panel said beads interlock without interference with folding.

17. A foldable non-conductive electrical enclosure for mounting in wallboard according to claim 10, said retaining screw being conductive for electrical bonding.

18. A foldable non-conductive electrical enclosure for mounting in wallboard according to claim 13, said retaining screw being conductive for electrical bonding.

19. A foldable non-conductive electrical semi-enclosure for mounting in wallboard comprising a one piece molded plastic foldable open face and open side enclosure consisting of a rectangular back panel hingedly connected by living hinge lines to top and bottom panels, said panels foldable to right angles with said back panel so as to form said open side enclosure, the front edge of said top and bottom panels each configured with two outwardly directed spaced apart mounting flanges, said top and bottom panels each configured with a laterally centered, recessed structure oriented perpendicular to and flush with said front edge of said panels and open to the exterior side of said panel, said top and bottom panels incorporating H pattern cable ports for inserting electrical cables, panel edges adjacent said open sides being configured with means for edge connecting to a similarly configured open side of other enclosures so as to form a multi-width enclosure, a stationary retaining screw rotatingly installed within each said tunnel structure, the head of each said screw being accessible for rotational manipulation by a screwdriver, said retaining screws being center-bored and tapped for accepting smaller mounting screws, the spacing of said retaining screws conforming to standard mounting dimensions of devices normally installed in such enclosures, and a retaining clip associated with each retaining screw, said clip comprising a nut, a mast, and a faceplate, said nut being threaded onto respective said retaining screw, said mast extending from said nut external of said enclosure and perpendicular to said retaining screw, said faceplate attached to said mast and oriented parallel to respective said mounting flanges, said retaining clip being rotable about one quarter turn between a retracted position against exterior surface of said panel and an extended centerline position by initial clockwise rotation of said retaining screw, said retaining clip being then movable forward towards said front edge by further clockwise rotation of said retaining screw.

20. A foldable non-conductive semi-enclosure for mounting in wallboard according to claim 19, said means for edge connecting comprising a bipolar keyed edge and locking channel system, a first half of the full length of the open face edges of said semi-enclosure configured with a said keyed edge, a second half of said length of said open face edge configured with a said locking channel, said keyed edge comprising uniformly spaced rectangular keyholes immediately adjacent to a straight panel edge, said locking channel comprising an open receiving channel structure within which on one wall are configured uniformly spaced tapered locking lugs, the taper of which ramps upwards going into said channel, said lugs sized for interlocking fit with said keyholes of said keyed edge, said locking channel being sufficiently elastic for being forced open without damage by inserting said keyed edge into said channel until said lugs interlock with said keyholes and then closing thereon.

* * * * *

UNITED STATES PATENT AND TRADEMARK OFFICE
CERTIFICATE OF CORRECTION

PATENT NO. : 6,170,685 B1
DATED : January 9, 2001
INVENTOR(S) : Currier

It is certified that error appears in the above-identified patent and that said Letters Patent is hereby corrected as shown below:

Column 11,
Line 35, delete "recessed structure", insert -- recessed tunnel structure --.

Signed and Sealed this

Sixteenth Day of July, 2002

Attest:

Attesting Officer

JAMES E. ROGAN
Director of the United States Patent and Trademark Office